US008054216B2

(12) United States Patent　　　　　　　　(10) Patent No.: US 8,054,216 B2
Kinoshita et al.　　　　　　　　　　　　　　(45) Date of Patent: Nov. 8, 2011

(54) RADAR DEVICE AND TARGET ANGLE DETECTION METHOD

(75) Inventors: Motohide Kinoshita, Kobe (JP); Hisateru Asanuma, Kobe (JP); Jun Tsunekawa, Nagoya (JP); Motomi Iyoda, Seto (JP); Tomoya Kawasaki, Toyota (JP)

(73) Assignees: Fujitsu Ten Limited, Kobe-shi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/320,413

(22) Filed: Jan. 26, 2009

(65) Prior Publication Data

US 2009/0207071 A1　　Aug. 20, 2009

(30) Foreign Application Priority Data

Jan. 29, 2008　(JP) ................................. 2008-017142

(51) Int. Cl.
*G01S 13/93*　(2006.01)
*G01S 7/02*　(2006.01)
*G01S 13/00*　(2006.01)

(52) U.S. Cl. ............ 342/147; 342/27; 342/70; 342/118; 342/127; 342/128; 342/146; 342/175; 342/195

(58) Field of Classification Search .................. 701/300, 701/301; 180/167–169; 342/27, 28, 70–81, 342/118, 127–133, 145–158, 175, 192–197, 342/385, 417, 442, 450, 458

See application file for complete search history.

(56) References Cited

U.S. PATENT DOCUMENTS

| 4,041,494 A | * | 8/1977 | Ewen et al. ................. 342/458 |
| 4,110,754 A | * | 8/1978 | Endo .......................... 342/147 |
| 4,342,997 A | * | 8/1982 | Evans ......................... 342/156 |

(Continued)

FOREIGN PATENT DOCUMENTS

| JP | A-2000-230974 | 8/2000 |
| JP | A-2001-051050 | 2/2001 |
| JP | A-2006-047114 | 2/2006 |
| WO | WO 2006/009122 A1 | 1/2006 |

OTHER PUBLICATIONS

Japanese Office Action issued in Japanese Patent Application No. 2008-017142, on Jan. 5, 2010, (with English Translation).
Nov. 9, 2010 Office Action issued in Japanese Patent Application No. 2008-017142 with English Translation.

*Primary Examiner* — Bernarr Gregory
(74) *Attorney, Agent, or Firm* — Oliff & Berridge, PLC

(57) ABSTRACT

A radar device has a plurality of receiving antennas which receive, as a reception wave, a radar wave sent in a predetermined reference direction and reflected by a target; a phase difference detection unit which detects a first phase difference of the reception wave received by a first receiving antenna pair that is spaced by a first gap, and a second phase difference of the reception wave received by a second receiving antenna pair that is spaced by a second gap smaller than the first gap; and an angle detection unit which performs a first process of determining, as a detection angle, an angle of the target relative to the reference direction being a mutually coincident angle from among a plurality of first angles corresponding to the first phase difference and a plurality of second angles corresponding to the second phase difference. The radar device allows expanding an angle detection range without reducing the resolution of the angle corresponding to the second phase difference.

8 Claims, 9 Drawing Sheets

U.S. PATENT DOCUMENTS

| | | | |
|---|---|---|---|
| 4,464,662 A * | 8/1984 | Tomasi | 342/156 |
| 4,626,860 A * | 12/1986 | Tricoles et al. | 342/442 |
| 5,227,803 A * | 7/1993 | O'Connor et al. | 342/442 |
| 6,573,859 B2 * | 6/2003 | Tokoro | 342/70 |
| 6,600,443 B2 * | 7/2003 | Landt | 342/147 |
| 7,301,496 B2 | 11/2007 | Honda et al. | |
| 7,612,706 B2 | 11/2009 | Honda et al. | |
| 2003/0112172 A1 * | 6/2003 | Shinoda et al. | 342/70 |
| 2006/0028375 A1 | 2/2006 | Honda et al. | |
| 2007/0182619 A1 | 8/2007 | Honda et al. | |

* cited by examiner

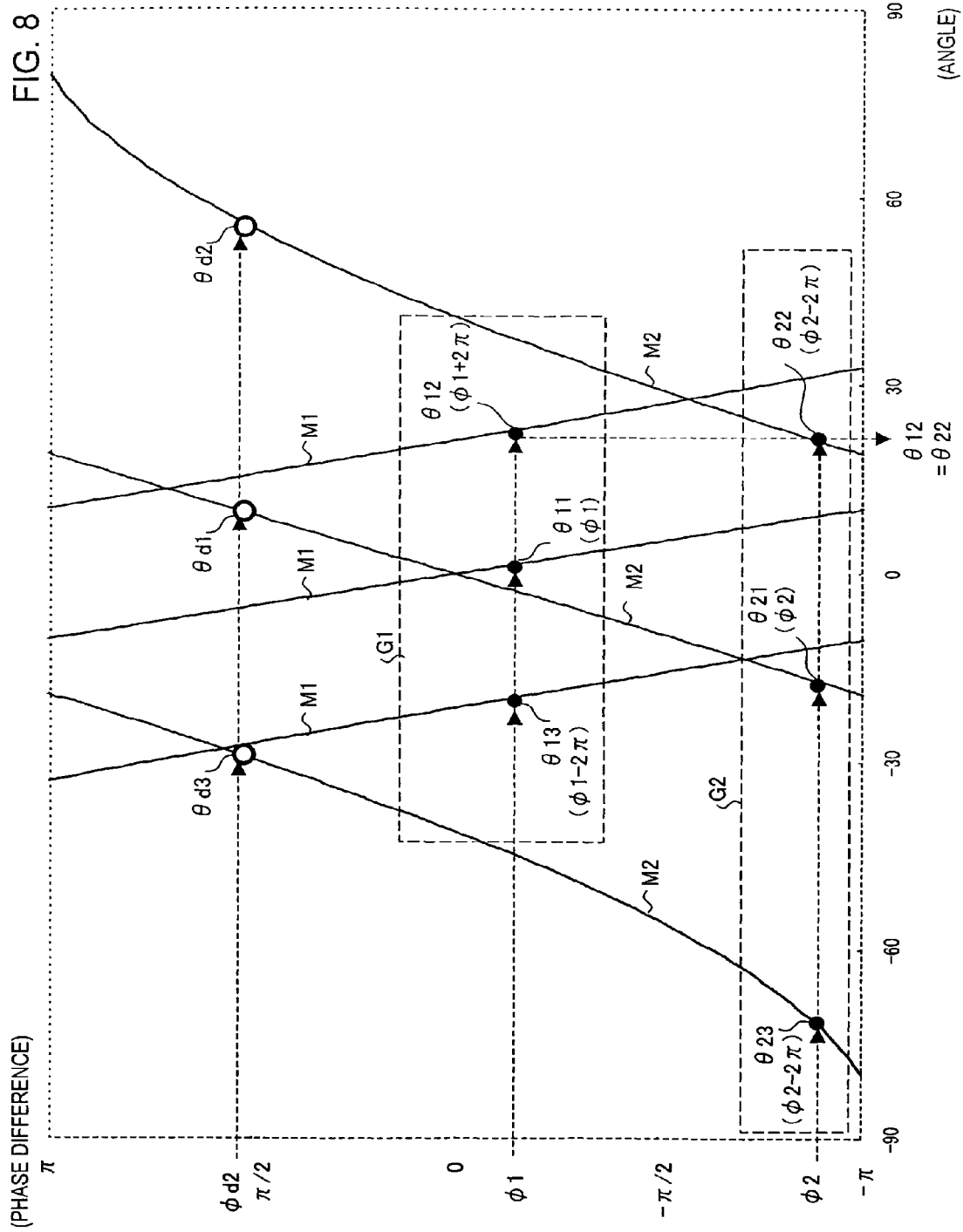

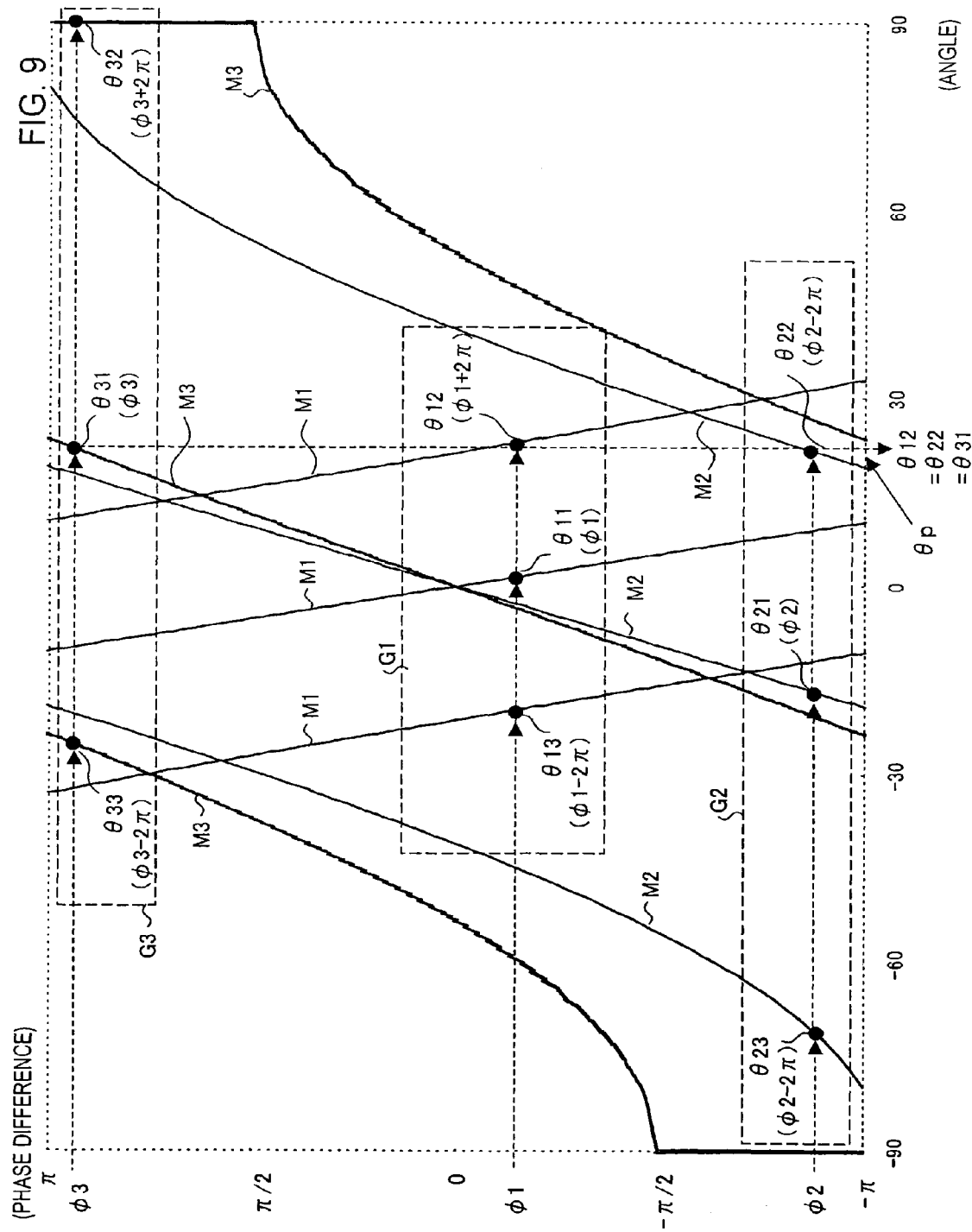

RADAR DEVICE AND TARGET ANGLE DETECTION METHOD

CROSS-REFERENCE TO RELATED APPLICATIONS

This application is based upon and claims the benefits of priority from the prior Japanese Patent Application No. 2008-017142, filed on Jan. 29, 2008, the entire contents of which are incorporated herein by reference.

BACKGROUND OF THE INVENTION

1. Field of the Invention

The present invention relates to a radar device for sending a radar wave in a predetermined reference direction, receiving as a reception wave the radar wave reflected by a target, and detecting the angle of the target relative to the reference direction. More particularly, the present invention relates to a radar device and a target angle detection method in which the above-mentioned angle is detected on the basis of a first phase difference of the reception wave received by a first receiving antenna pair that is spaced by a first gap, and a second phase difference of the reception wave received by a second receiving antenna pair that is spaced by a second gap smaller than the first gap.

2. Description of the Related Art

Known vehicle control systems for vehicle collision response include control systems in which the surroundings of a cruising vehicle are scanned by an on-board radar device, and the vehicle control system accelerates/decelerates the vehicle and/or activates safety devices when a collision with an obstacle is predicted. Examples of such on-board radar devices include, for instance, phase monopulse radar devices such as the one disclosed in Japanese Patent Application Laid-open No. 2001-51050, in which the angle of a target is detected on the basis of the phase of radar waves.

FIG. 1 and FIG. 2 are diagrams for explaining a method for detecting the angle of a target in a phase monopulse radar device. As illustrated in FIG. 1, a phase monopulse radar sends a radar wave W1 in a reference direction that corresponds to the front direction F of the radar device. In the phase monopulse radar device, a receiving antenna pair A1 constituted by two receiving antennas 11, 12 receives a radar wave W2, reflected by a target T, in the form of two reception waves W21, W22.

Herein, the gap d1 between the receiving antennas 11, 12 is very small compared to the distance to the target T, and hence the target T may be regarded as being at infinity. Such being the case, the incoming directions of the reception waves W21, W22 in the receiving antennas 11, 12, which give the angle $\theta$ of the target T (hereinafter, simply angle of the target) relative to the front F, which is the reference direction of the radar device, are identical. In consequence, the resulting difference $\Delta d1$ between the propagation distances of the reception waves W21, W22 is proportional to the gap d1 between the two receiving antennas. A phase difference arises as a result between the two reception waves. The angle $\theta$ of the target T can be obtained on the basis of equation 1 below, in which $\lambda$ denotes the wavelength of the reception waves W21, W22 and $\Phi 1$ is the above-mentioned phase difference.

$$\theta = \arcsin(\lambda \cdot \Phi 1/(2\Pi \cdot d1)) \quad \text{Equation 1}$$

The relationship of Equation 1 is illustrated in FIG. 2A. In FIG. 2A, the axis of ordinate represents the phase difference of the reception waves and the axis of abscissa represents the angle of the target, with 0 degrees as the reference direction.

Herein, an angle $\theta 1$ corresponding to the phase difference $\Phi 1$ is uniquely determined within a −10 degree to +10 degree range on the basis of the straight line L1, which corresponds to Equation 1.

The slope of the straight line L1 is proportional to the gap d1 between the receiving antennas 11, 12. Therefore, the slope of the straight line L1 becomes less steep, as illustrated by the broken line the figure, as the gap d1 decreases. In turn, the angle variation relative to variation in the phase difference $\Phi 1$ becomes greater; i.e. angle resolution decreases. Accordingly, the gap d1 between the receiving antennas 11, 12 is established in such a manner so as to obtain a slope of the straight line L1 that affords an adequate angle resolution. On the basis of the straight line L1 of FIG. 2A, however, the angle can only be determined within a −10 degree to +10 degree range. Therefore, the phase difference $\Phi 1$ may be replicated beyond $\pm\Pi$ in order to expand the detection range but without reducing angle resolution.

In such a case, as illustrated in FIG. 2B, an angle $\theta 1$ corresponding to the phase difference $\Phi 1$, an angle $\theta 2$ corresponding to a phase difference $\Phi 1+2\Pi$ and an angle $\theta 3$ corresponding to a phase difference $\Phi 1-2\Pi$ are determined on the basis of the phase difference $\Phi 1$, within a wider angle range than −10 degree to +10 degrees. However, the angle cannot now be uniquely specified on the basis of the phase difference $\Phi 1$.

Returning to FIG. 1, the phase monopulse radar device is provided with a receiving antenna pair A2 having a receiving antenna gap smaller than that of the receiving antenna pair A1. Specifically, the receiving antenna pair A2 is constituted by the receiving antenna 11 and a receiving antenna 13 spaced apart from the receiving antenna 11 by a gap d2.

The relationship between the angle of the target and a phase difference $\Phi 2$ of the reception wave at the receiving antenna pair A2 is given by a straight line L2, illustrated in FIG. 2C, having a shallower slope than the straight line L1. Angle $\theta 1$ corresponding to the phase difference $\Phi 2$ can be uniquely determined on the basis of the straight line L2 within a range from −20 degrees to +20 degrees. Although the angle can now be specified uniquely within a wider range than for the straight line L1, the angle resolution decreases in this case. The phase monopulse radar device, therefore, checks a plurality of angles $\theta 1$, $\theta 2$, $\theta 3$ determined with high angle resolution on the basis of the phase difference $\Phi 1$, against an angle $\theta 1$ determined with low angle resolution on the basis of the phase difference $\Phi 2$, and specifies the angle of the target by using the coinciding angle $\theta 1$ as the detection angle.

By virtue of its use for scanning obstacles around the vehicle, the above-described phase monopulse radar device should desirably have a wider target angle detection range. In the above-described method, though, the target angle detection range is restricted to an angle range that corresponds uniquely to the phase difference $\Phi 2$, namely a range from −20 degrees to +20 degrees, as illustrated in FIG. 2C. Expanding the angle detection range by making the slope of the straight line L2 yet shallower, however, is undesirable, since doing so results in lower angle resolution. Also, modifying to that end the gap between receiving antennas 11 and 13 involves substantial overhaul costs of the radar device when the latter is already fitted in the final product.

SUMMARY OF THE INVENTION

Therefore, it is an object of the present invention to provide a phase monopulse radar device and a target angle detection method that allow expanding the angle detection range without reducing angle resolution.

In order to achieve the above goal, a first aspect of the present invention is a radar device, having a plurality of receiving antennas which receive, as a reception wave, a radar wave sent in a predetermined reference direction and reflected by a target; a phase difference detection unit which detects a first phase difference of the reception wave received by a first receiving antenna pair that is spaced by a first gap, and a second phase difference of the reception wave received by a second receiving antenna pair that is spaced by a second gap smaller than the first gap; and an angle detection unit which performs a first process of determining, as a detection angle, an angle of the target relative to the reference direction being a mutually coincident angle from among a plurality of first angles corresponding to the first phase difference and a plurality of second angles corresponding to the second phase difference.

In the above aspect, a mutually coincident angle is determined, as a detection angle, from among a plurality of first angles corresponding to a first phase difference and a plurality of second angles corresponding to a second phase difference. Therefore, the angle can be detected over a wider range than is the case when using only one second angle corresponding to the second phase difference. That is, the angle detection range is expanded, not by reducing the angle resolution for the second phase difference, but by determining a plurality of second angles corresponding to the second phase difference. This allows expanding the angle detection range without reducing angle resolution.

BRIEF DESCRIPTION OF THE DRAWINGS

FIG. 8 is a diagram illustrating correspondences between target angle and reception-wave phase differences $\Phi 1$, $\Phi 2$ of the present embodiment; and FIG. 9 is a diagram illustrating correspondences between target angle and reception-wave phase differences $\Phi 1$, $\Phi 2$ and $\Phi 3$ of the present embodiment.

DESCRIPTION OF THE PREFERRED EMBODIMENTS

Embodiments of the present invention are explained below with reference to accompanying drawings. The technical scope of the present invention, however, is not limited to these embodiments, and includes the subject matter set forth in the claims as well as equivalents thereof.

Figure 1:
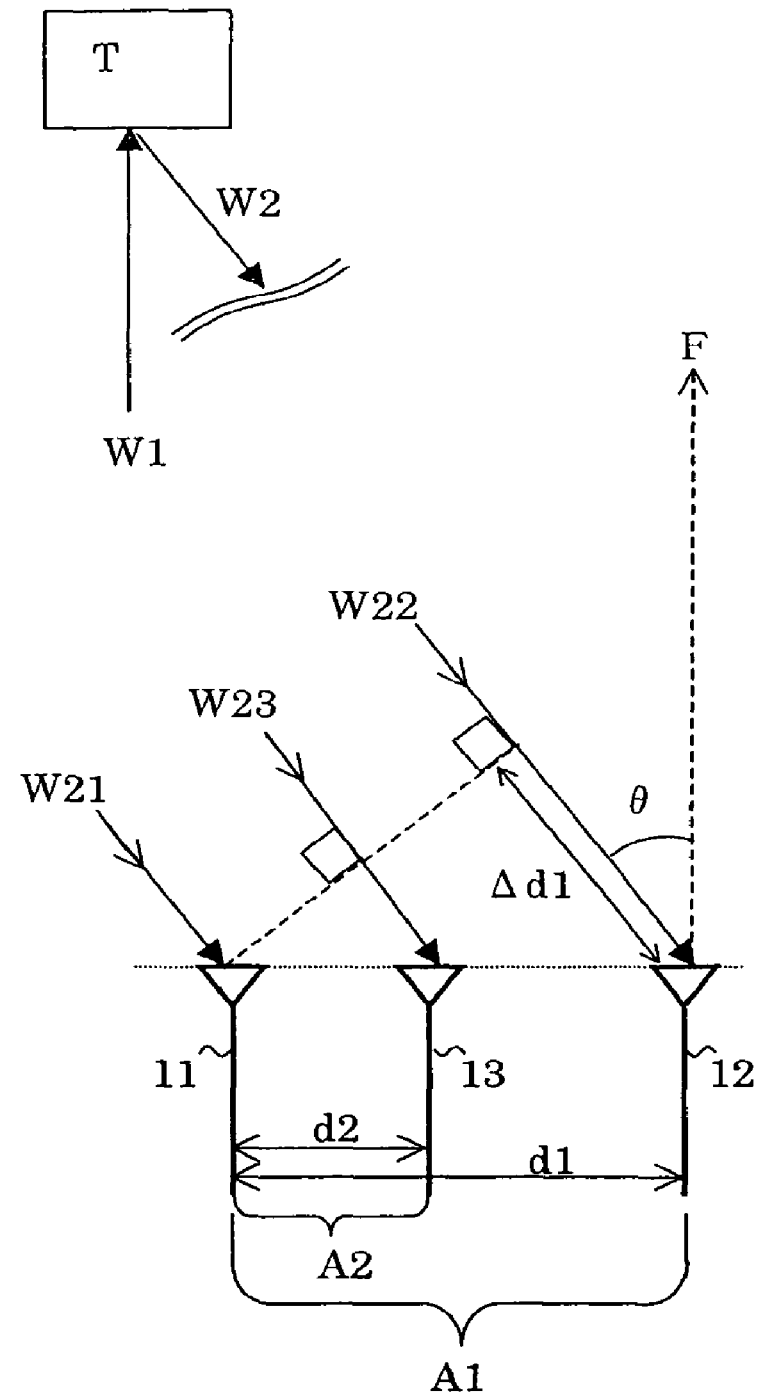
FIG. 1 is a diagram for explaining a method for detecting the angle of a target in a phase monopulse radar device.
Figure 2A:
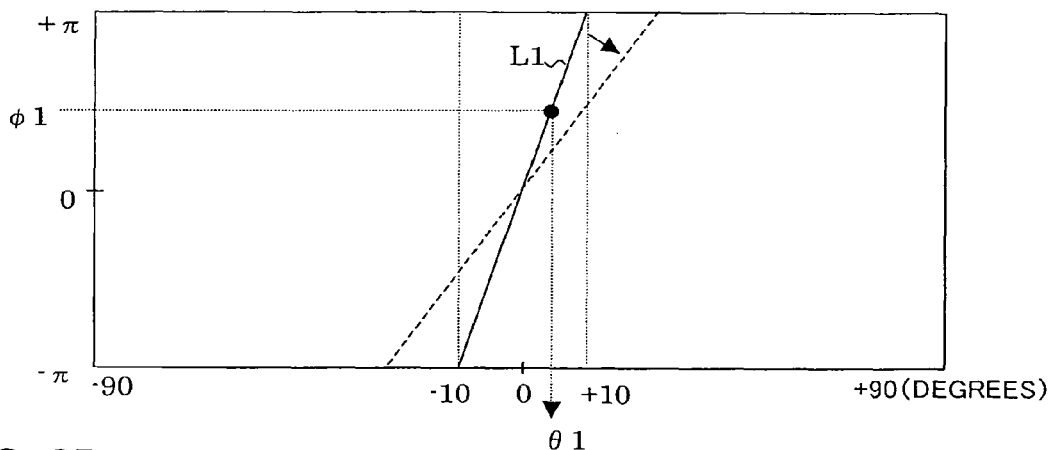
FIG. 2A is a diagram illustrating a correspondence between reception-wave phase difference and target angle.
Figure 2B:
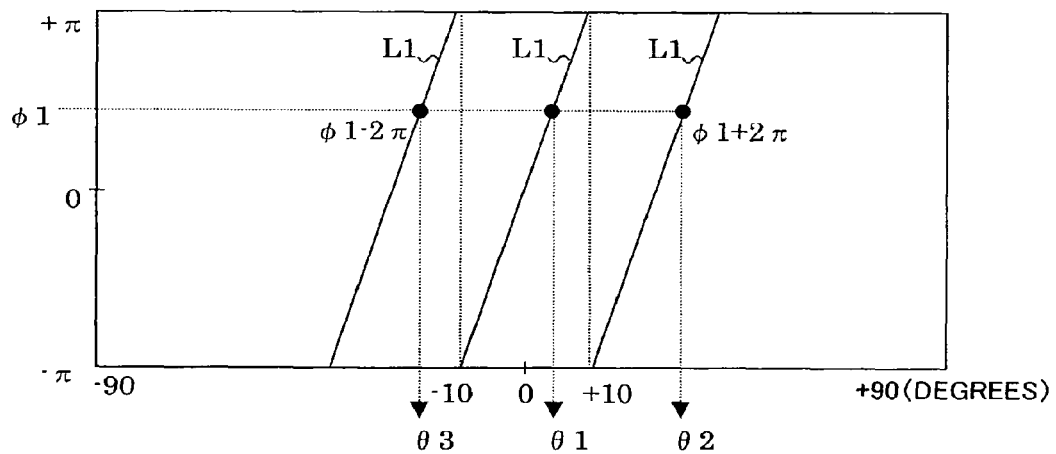
FIG. 2B is a diagram illustrating a correspondence between reception-wave phase difference and target angle when the phase difference is replicated beyond ±Π.
Figure 2C:
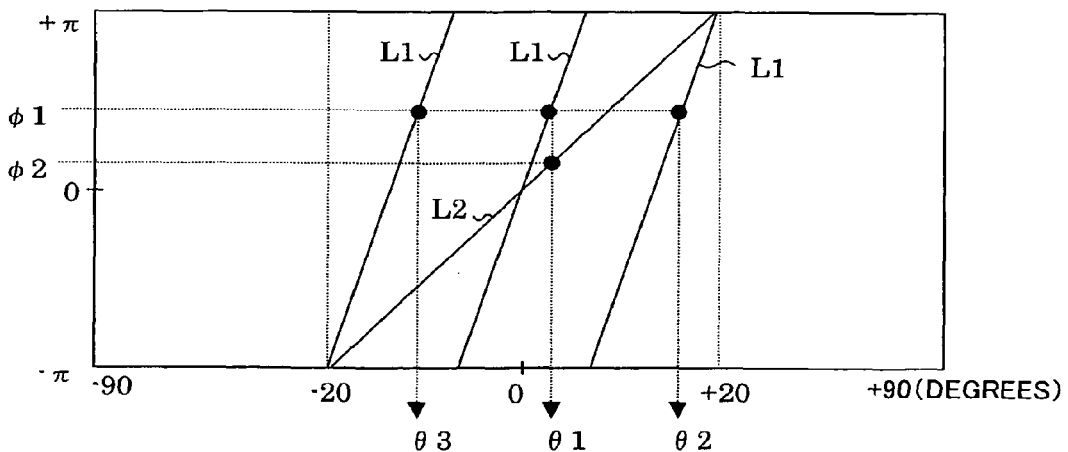
FIG. 2C is a diagram illustrating a correspondence between reception-wave phase difference and target angle in the case of a narrow receiving antenna gap.
Figure 3:
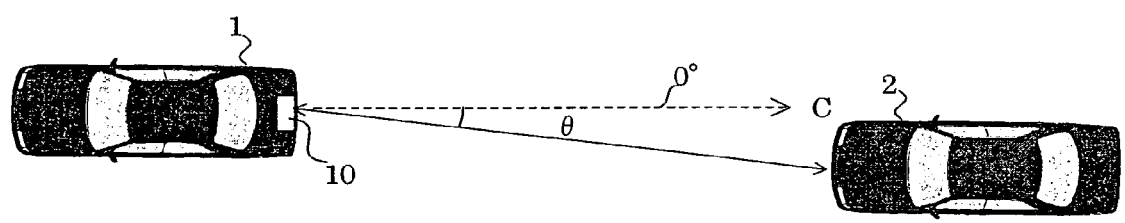
FIG. 3 is a diagram illustrating an example of a radar device of the present embodiment installed in a vehicle.

FIG. 3 illustrates an example of a radar device of the present embodiment installed in a vehicle. The radar device of the present embodiment is a phase monopulse radar device 10 that is installed in the vicinity of the rear bumper of a vehicle 1. The rearward direction C of the vehicle 1 is the reference direction of the radar device 10. The radar device 10 sends radar waves along that reference direction. The radar device 10 receives, as reception waves, radar waves that are reflected by a target (following vehicle 2 or the like), and which are received by a receiving antenna pair composed of a combination of two receiving antennas from among three receiving antennas. The radar device 10 detects an angle θ of the target relative to the reference direction on the basis of phase differences in the reception waves at the respective receiving antennas.

The radar device 10 uses FM-CW (frequency modulated-continuous wave) as the radar waves. The radar device 10 detects the angle θ, the relative speed and the relative distance to the target based on frequency differences between the sent radar waves (hereinafter, transmission waves) and the reception waves.

On the basis of the detection results of the radar device 10, a vehicle control system of the vehicle 1 (not shown) operates the vehicle and/or controls safety devices for collision response.

Figure 4:
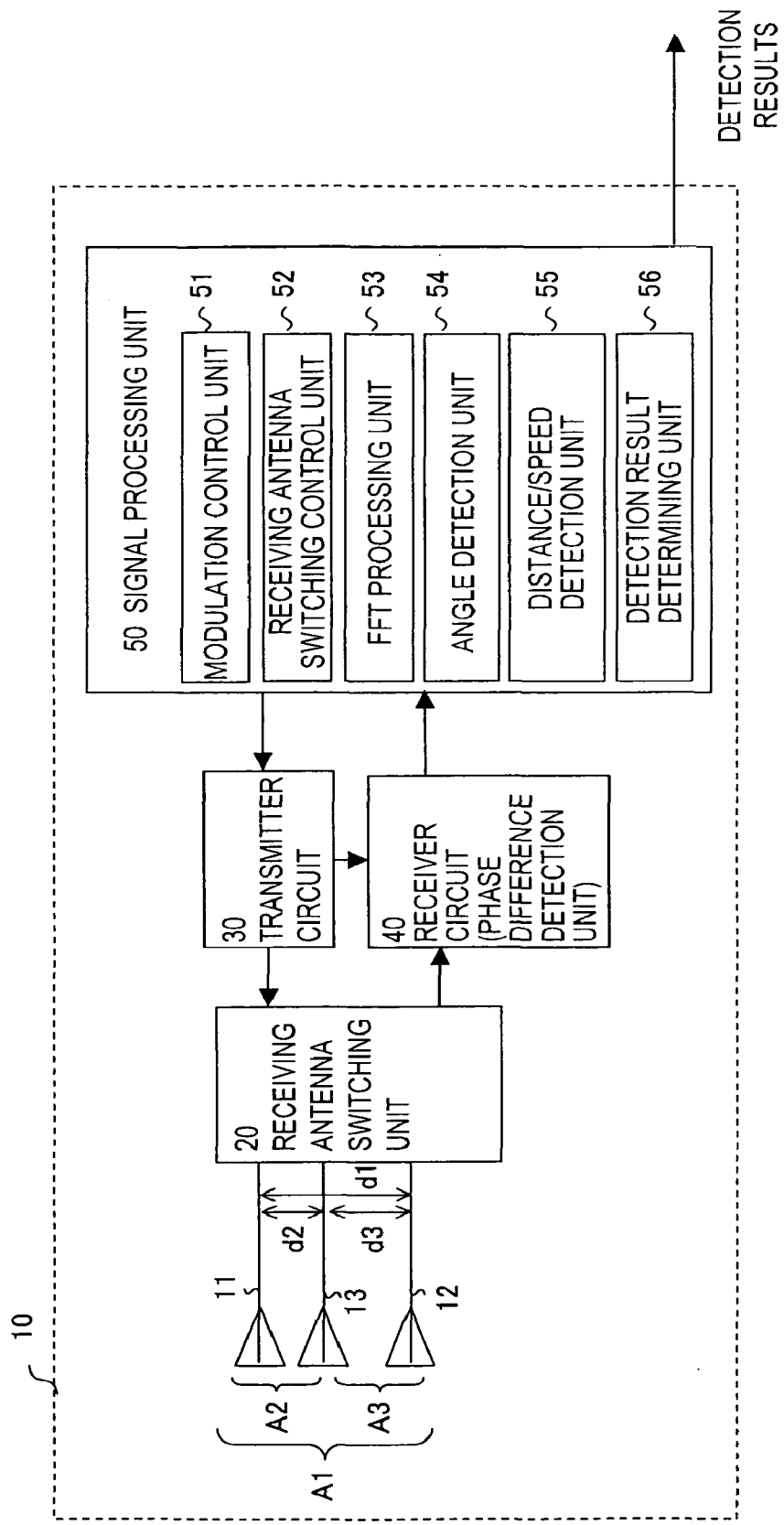
FIG. 4 is a diagram illustrating a configuration example of a radar device 10.
Figure 5:
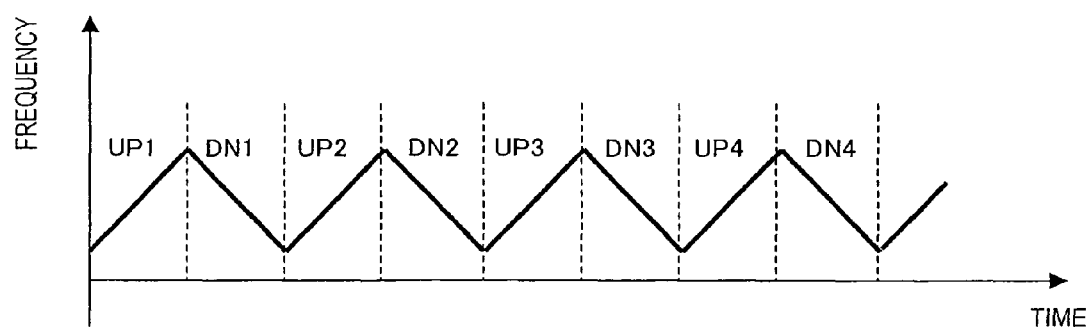
FIG. 5 is a diagram illustrating a relationship between radar wave frequency and time.

FIG. 4 illustrates a configuration example of the radar device 10. A transmitter circuit 30 generates triangular frequency-modulated radar waves in which rise intervals and fall intervals alternate with each other repeatedly. FIG. 5 illustrates the relationship between time and frequency of the radar waves. As illustrated in FIG. 5, the frequency of the radar waves increases gradually, in linear fashion, at rise intervals UP1, UP2, . . . , and decreases gradually, in linear fashion, at fall intervals DN1, DN2, . . . .

Part of the radar waves is branched and inputted into a receiver circuit 40, while another part is inputted into a receiving antenna switching unit 20.

The receiving antenna switching unit 20 performs time-division transmission and reception of the radar waves in a receiving antenna 11. The receiving antenna switching unit 20 sequentially performs electrical switching between three receiving antenna pairs composed of each two among three receiving antennas 11, 12, 13. Thereby, radar waves reflected by the target are received by each receiving antenna pair as reception waves.

Specifically, one receiving antenna pair performs reception at a frequency rise interval and fall interval pair of the radar waves illustrated in FIG. 5. For instance, the antenna pairs are sequentially switched at the start of each frequency rise interval, in the order receiving antenna pair A1, composed of receiving antennas 11, 12, at the frequency rise interval UP1 and fall interval DN1, receiving antenna pair A2, composed of receiving antennas 11, 13, at the at the frequency rise interval UP2 and fall interval DN2, and receiving antenna pair A3, composed of receiving antennas 12, 13, at the frequency rise interval UP3 and fall interval DN3. The receiving antenna switching unit 20 inputs the reception waves from the respective antenna pairs into the receiver circuit 40.

The receiver circuit 40 detects the phase differences of the reception waves by the respective receiving antenna pair. Accordingly, the receiver circuit 40 corresponds to the "phase difference detection unit".

The receiving antennas are arranged in such a manner that the gaps between them are all dissimilar, namely in such a manner that (d3=d1−d2 and d3>d2), wherein d1 is the gap between the receiving antennas 11, 12 of the receiving antenna pair A1, d2 is the gap between the receiving antennas 11, 13 of the receiving antenna pair A2, and d3 is the gap between the receiving antennas 12, 13 of the receiving antenna pair A3. As a result, a phase difference Φ1 of the reception wave at the receiving antenna pair A1, a phase difference Φ2 of the reception wave at the receiving antenna pair A2, and a phase difference Φ3 of the reception wave at the receiving antenna pair A3 are all dissimilar. The three receiving antenna pairs can be configured on the basis of combinations of two receiving antennas, among the three receiving antennas, by disposing the receiving antennas spaced apart from each other as described above. In turn, this allows reducing the number of parts and shrinking the size of the radar device.

The receiver circuit 40 generates a frequency difference signal corresponding to the frequency difference between the reception waves and the radar waves i.e. the transmission waves, on the basis of the reception waves and part of the radar waves inputted by the transmitter circuit 30. The receiver circuit 40 inputs the phase difference of the reception waves and the frequency difference signal into the signal processing unit 50 for each receiving antenna pair.

The signal processing unit 50 has a modulation control unit 51 that generates the radar waves that are frequency-modulated in the transmitter circuit 30, and a receiving antenna switching control unit 52 that causes the receiving antenna switching unit 20 to switch between receiving antenna pairs at predetermined timings, via the transmitter circuit 30. The signal processing unit 50 has an FFT processing unit 53 that performs FFT processing (fast Fourier transform) on reception wave signals and frequency difference signals inputted by the receiver circuit 40, after the signals have been AD-converted.

The signal processing unit 50 further has an angle detection unit 54 that detects the angle of a target in accordance with a below-described procedure, on the basis of phase differences in the reception waves at the three receiving antenna pairs; a distance/speed detection unit 55 that determines the relative speed and relative distance of the target on the basis of the frequency of the frequency difference signals; and a detection result determining unit 56 that determines whether detection results including angle, relative speed and relative distance may be outputted, and that outputs the detection results to a control device of the vehicle control system when the results may be outputted.

The signal processing unit 50 is constituted by a microcomputer having, for instance, a CPU that performs computations in accordance with processing programs for each of the above units, a ROM that stores these programs, and a working-space RAM. The various units above are realized by way of a processing program for the operation of each unit, and by way of a CPU that runs in accordance with the processing programs.

Figure 6:
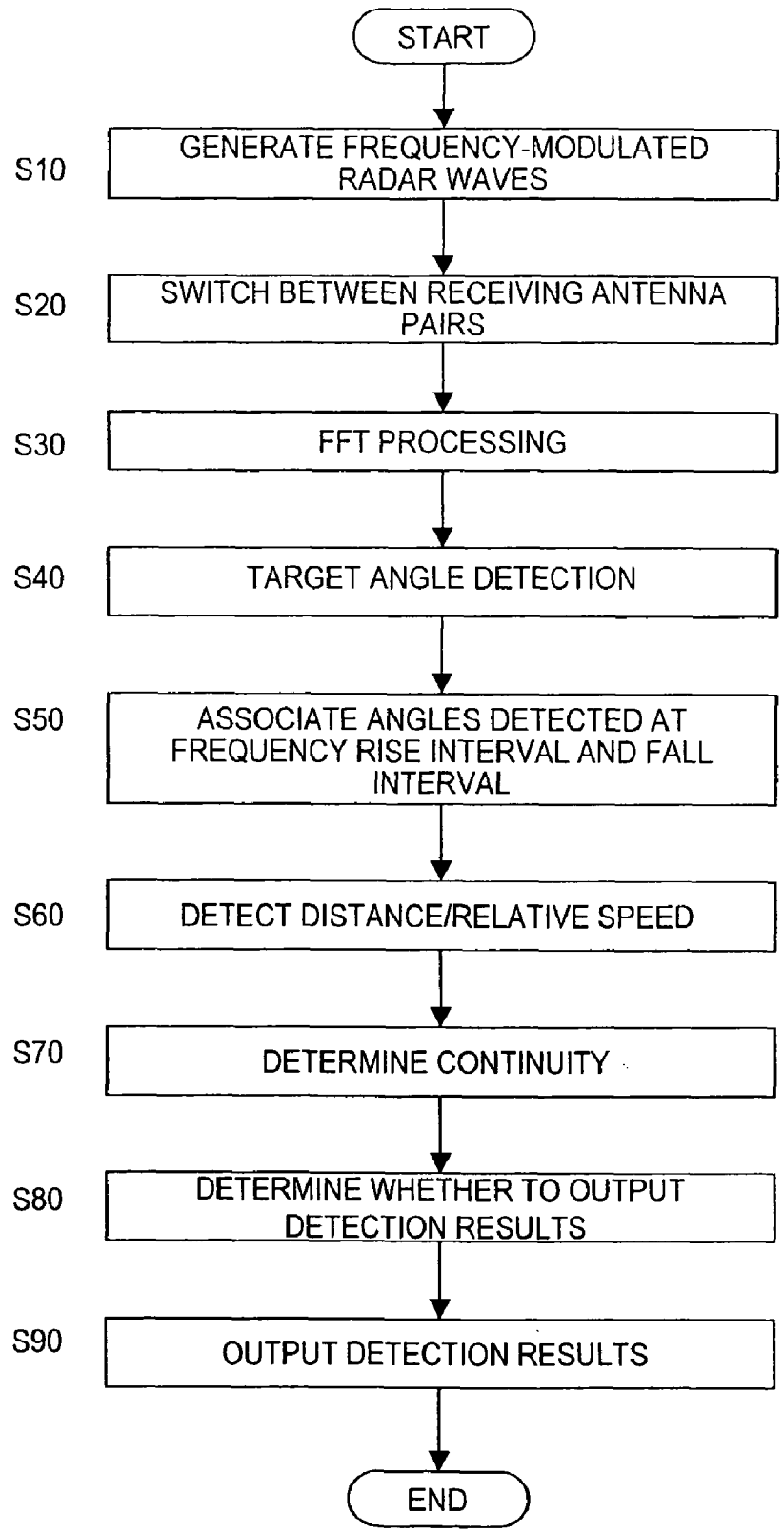
FIG. 6 is a flowchart for explaining the operation procedure of each unit of a signal processing unit 50.

FIG. 6 is a flowchart for explaining the operation procedure of each unit of the signal processing unit 50. In each unit of the signal processing unit 50, the following steps S10 to S90 are repeated for each frequency rise interval and fall interval pair of the radar waves illustrated in FIG. 5.

Firstly, the modulation control unit 51 generates a radar wave that is frequency-modulated in the transmitter circuit 30 (S10), and sends the radar wave. The receiving antenna switching control unit 52 causes the receiving antenna switching unit 20 to switch between the receiving antenna pairs A1, A2 and A3 (S20) that perform reception thereupon.

The FFT processing unit 53 subjects the reception wave signal and the frequency difference signal of each receiving antenna pair to a FFT (fast Fourier transform) process, and performs frequency analysis on the reception wave signal and frequency analysis on the frequency difference signal for each frequency rise interval and fall interval of the radar wave (S30).

The angle detection unit 54 detects the angle of the target for each frequency rise interval and fall interval of the radar wave (S40). The angle detection unit 54 detects the frequency at which the power of the FFT-processed reception wave signal forms a peak, for each frequency rise interval and fall interval of the radar wave. The angle detection unit 54 detects the phase differences of the reception wave of a frequency that forms a peak, on the basis of the reception wave signal from the receiving antenna pairs for that interval. The angle detection unit 54 detects the angle of the target on the basis of the phase differences. The angle detection procedure will be explained in detail further on.

When the angles detected at the frequency rise interval and fall interval pair the power of the reception wave signals at that time lie within a predetermined error range, the angle detection unit 54 associates the detected angles and the power, and stores these in the RAM of the signal processing unit 50 (S50).

When the power of the reception wave signal is associated to the angle detected for the frequency rise interval and fall interval pair, the distance/speed detection unit 55 determines the relative speed and the relative distance, for that target, on the basis of the frequency of the frequency difference signal (S60).

The detection result determining unit 56 determines whether the detection results (angle, relative distance, relative speed and reception wave signal power) in a previous scan and the detection results in a current scan lie within a predetermined error range, one scan corresponding herein to one frequency rise interval and fall interval pair. The detection result determining unit 56 determines that the detection results have continuity when the difference between angles is within a predetermined error range, for instance within 5 degrees, or when the position of the target in the transversal direction, relative to the own-vehicle rearward direction C, is within 2 meters, as determined from angle and relative distance (S70).

When the detection result determining unit 56 determines that there is continuity over a predetermined number of times, for instance over three or more times, the detection result determining unit 56 decides that the latest detection results may be outputted (S80). Specifically, the detection result determining unit 56 determines whether the positional relationship of the target in transversal direction, relative to the rearward direction C of the own vehicle, lies within a predetermined range by determining, for instance, whether the probability that the target is within a distance range corresponding to being in the same lane is equal to or greater than a predetermined threshold value, such that when that probability is equal to or greater than the threshold value, the detection result determining unit 56 decides that the detection results may be outputted. When plural targets are detected, alternatively, the detection result determining unit 56 determines whether the plural targets are the same target on the basis of the power distribution shape of the reception waves, such that when the targets are judged to be the same, the detection result determining unit 56 corrects the detection results so as to render them outputable.

The detection result determining unit 56 outputs the detection results, judged to be outputable, to the control device of the vehicle control system (S90). The detection results are stored in the RAM of the signal processing unit 50, for reference in the angle detection step S40 on a subsequent scan.

The angle detection procedure performed by the angle detection unit 54 in the above step S40 will be explained in detail next with reference to FIGS. 7 and 8.

Figure 7:
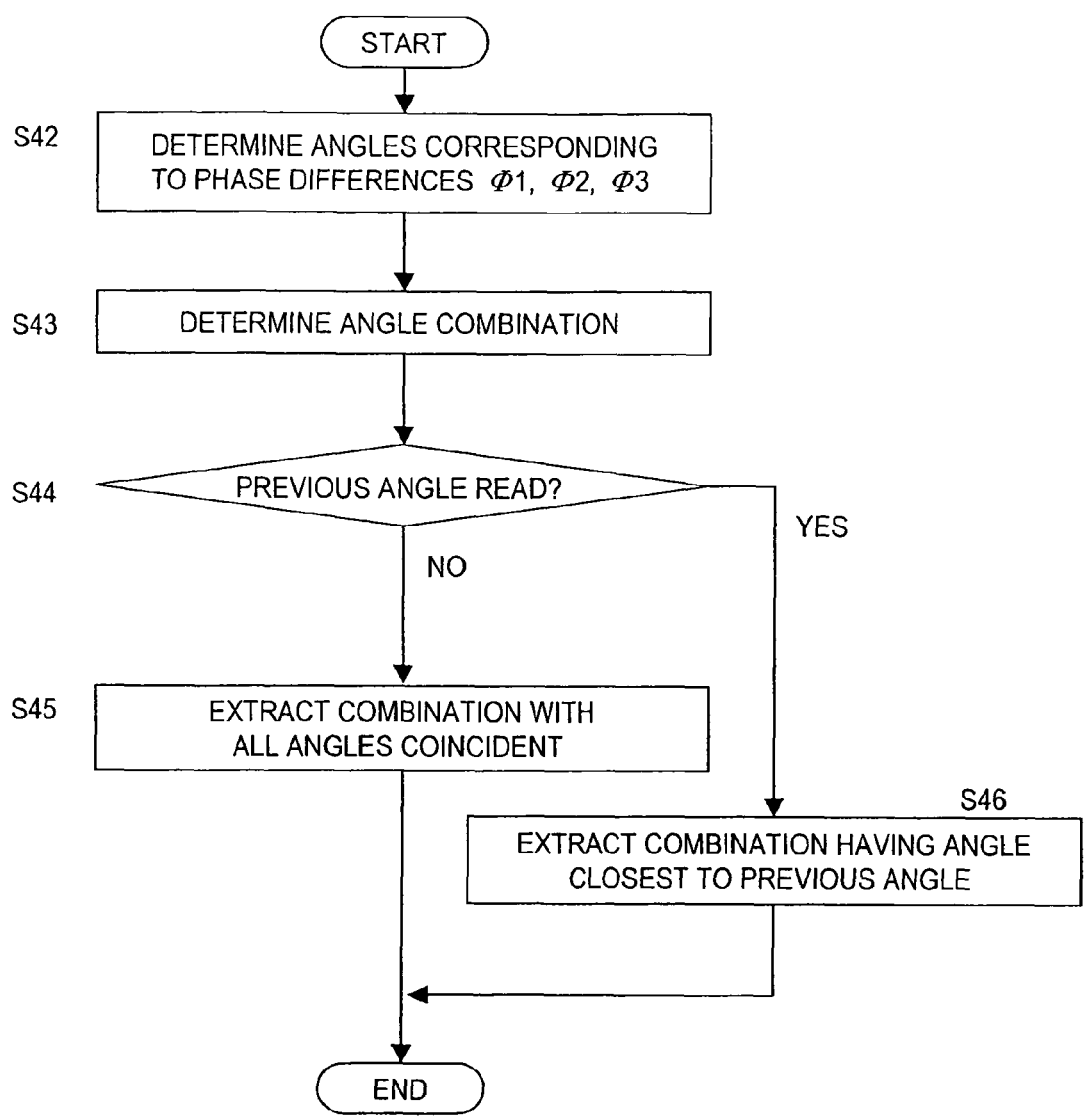
FIG. 7 is a flowchart illustrating a specific angle detection procedure by an angle detection unit 54.

FIG. 7 is a flowchart illustrating a specific angle detection procedure by the angle detection unit 54. FIGS. 8 and 9 illustrate the correspondence between the phase difference of reception waves, in the axis of ordinate, and the angle of the target relative to the reference direction (0 degrees), in the axis of abscissa.

Firstly, the angle detection unit 54 determines the target angles corresponding to the phase differences Φ1, Φ2, Φ3 on the basis of the phase differences Φ1, Φ2, Φ3 at the receiving antenna pairs A1 to A3 (S42). To do so, the angle detection unit 54 refers to correspondences between the phase differences of the reception waves and the target angles, such as those illustrated in FIG. 8.

FIG. 8 illustrates a correspondence M1 between target angle and the phase difference Φ1 of the reception wave at the receiving antenna pair A1, and a correspondence M2 between target angle and the phase difference Φ2 of the reception wave at the receiving antenna pair A2. The correspondences M1, M2 correspond to angles ranging from −90 degrees to +90 degrees, over a range of the respective phase difference ±2Πln. Since the phase differences Φ1, Φ2 of the reception wave are replicated by ±Π, the range of the angle determined in accordance with a respective phase difference is made wider than when the phase differences are not replicated.

The receiving antenna gaps d1, d2 in the receiving antenna pairs A1, A2 are established in such a manner that the correspondences M1, M2 between angles and reception-wave phase differences are dissimilar, and in such a manner so as to obtain adequate respective angle resolutions. At the receiving antenna pair A1, the phase difference Φ1 corresponds to the phase lag of the reception wave at the receiving antenna 11 relative to the reception wave at the receiving antenna 12. Hence, the slope of the correspondence M1 is negative. At the receiving antenna pair A2, by contrast, the phase difference Φ2 corresponds to the phase lead of the reception wave at the receiving antenna 11 relative to the reception wave at the receiving antenna 13. Hence, the slope of the correspondence M2 is positive.

Firstly, the angle detection unit 54 determines an angle θ11 corresponding to the phase difference Φ1, an angle θ12 corresponding to the phase difference Φ1+2Π, and an angle θ13 corresponding to the phase difference Φ1−2Π, on the basis of the phase difference Φ1, in accordance with the correspondence M1. Angles θ11, θ12, θ13 are determined within a range from −35 degrees to +35 degrees. For the sake of a simpler explanation, angles θ11, θ12, θ13 determined on the basis of the phase difference Φ1 are grouped into an angle group G1.

Next, the angle detection unit 54 determines an angle θ21 corresponding to the phase difference Φ2, an angle θ22 corresponding to the phase difference Φ2+2Π, and an angle θ23 corresponding to the phase difference Φ2−2Π, on the basis of the phase difference Φ2, in accordance with the correspondence M2. Angles θ21, θ22, θ23 are determined within a range from −80 degrees to +80 degrees. Angles θ21, θ22, θ23 determined on the basis of the phase difference Φ2 are grouped into an angle group G2.

In a conventional method, wherein there is determined angle θ21 corresponding to the phase difference Φ2, and angles coinciding with angle θ21 are determined on the basis of the angle group G1, the angle detection range is restricted to the range within which an angle can be determined uniquely for the phase difference Φ2, namely an angle from about −20 degrees to about +20 degrees. In the present embodiment, however, angles θ22, θ23 corresponding to the phase differences Φ2+2Π, Φ2−2Π are determined within a range from −80 degrees to +80 degrees. Accordingly, the target angle detection range can be expanded from the conventional range of −20 degrees to +20 degrees to about −35 degrees to +35 degrees by specifying the detection results on the basis of the angle group G1 and by using the angle group G2. As a result, angle θ12 of the angle group G1 and angle θ22 of the angle group G2 coincide, and hence angle θ12 (=θ22) can be used as the detection angle.

Sometimes, however, the detection angle cannot be specified on the basis of the angle group G1 and the angle group G2, owing to errors arising from noise or hardware characteristics. In a case in point, there are determined an angle θd1, an angle θd2 and an angle θd3 corresponding to a phase difference Φd2, instead of angle θ21 of the angle group G2. In this case, the angle θd1 is located between angle θ11 and angle θ12 of the angle group G1. Hence, it cannot be specified whether the angle θd1 coincides with, or approximates to, either angle θ11 or θ12.

For this reason, the angle detection unit 54 of the present embodiment employs further a correspondence M3 between target angle and the phase difference Φ3 of reception waves at the receiving antenna pair A3, such as the one illustrated in FIG. 9. The correspondence data of the correspondence M3 are stored beforehand in the ROM of the signal processing unit 50.

The gap d3 between receiving antennas in the receiving antenna pair A3 is established in such a manner that the correspondence M3 is different from the correspondences M1, M2, and in such a manner so as to obtain an adequate angle resolution. In the receiving antenna pair A3, the phase difference Φ3 corresponds to the phase lead of the reception wave at the receiving antenna 12 relative to the reception wave at the receiving antenna 13. Hence, the slope of the correspondence M3 is positive.

The angle detection unit 54 determines an angle θ31 corresponding to the phase difference Φ3, an angle θ32 corresponding to the phase difference Φ3+2Π, and an angle θ33 corresponding to the phase difference Φ3−2Π, in accordance with the correspondence M3. Angles θ31, θ32, θ33 are determined herein within a range from −90 degrees to +90 degrees. Angles θ31, θ32, θ33 determined on the basis of the phase difference Φ3 are grouped into an angle group G3.

The angle detection unit 54 narrows down the angle by using the angle groups G1 to G3. As a result, the angle can be narrowed down with greater precision than when using just two angle groups.

After determining the above-described angle groups, the angle detection unit 54 determines combinations composed of one angle for each angle group (S43). In this case there are three angle groups having three angles, and thus there are determined a total of 27 combinations that include an angle from the angle group G1, an angle from the angle group G2 and an angle from the angle group G3.

The angle detection unit 54 reads then an angle that was judged outputable in a previous scan, from the RAM of the signal processing unit 50 (S44). If no previous angle is stored, for instance immediately after startup of the radar device 10, or when in the immediately previous scan it was not determined that continuity held over three or more times (NO in S44), the process moves onto step S45. If a previous angle is stored (YES in S44), the process moves onto step S46.

An explanation follows first on an angle calculation step in a case where no previous angle is stored (S45). The angle detection unit 54 selects, from among the angle combinations determined in step S43, a combination in which all the angles of the combination coincide. Specifically, the angle detection unit 54 determines the angle differences in the combinations, for all the 27 combinations, and extracts a combination for which the angle difference is zero. In the above-described case, angles θ12, θ22 and θ31 coincide, and thus the angle difference is zero. Accordingly, this combination is extracted, whereupon the angle detection unit 54 uses the angles included in the combination, namely angle θ12 (=θ22=θ31), as the detection angle.

The angles may fail to coincide exactly with each other on account of, for instance, noise and hardware characteristics. Therefore, the angle detection unit 54 may extract the angle combination for which the difference between angles is minimal, considering a combination in which angles are closest to each other as a combination of coincident angles, whereupon the angle detection unit 54 may use then the average of the angles of that combination as the detection angle. In a combination of three angles, such as the one described above, the combination used as a combination where angles coincide is a combination of three angles in which the difference between the largest angle and the smallest angle is minimal.

An explanation follows next on a case in which a previous angle is stored (S46). The angle detection unit 54 compares the previous angle with the angles of the angle groups G1 to G3, and extracts the angle having the smallest difference with the previous angle. In the case, for instance, of a previous angle θp in FIG. 9, the angle detection unit 54 extracts angle θ12 having the smallest difference with angle θp in the angle group G1, extracts angle θ22 having the smallest difference with angle θp in the angle group G2, and extracts angle θ32 having the smallest difference with angle θp in the angle group G3.

The angle detection unit 54 determines the average of the angles extracted from each angle group, i.e. angles θ12, θ22, θ32 in the example above, and uses the average as the detection angle. Doing so allows shortening the process, as compared with determining angle differences for the 27 combinations. In the present embodiment, in other words, there are processed 27 angle combinations as a result of widening the angle detection range by replicating the phase differences Φ1, Φ2, Φ3 by ±Π, but the processing load is reduced.

Therefore, the angle detection unit 54 executes the step S46 for each scan while there is ongoingly judged, for each scan, that the detected angle has continuity. This allows shortening as a result processing time, and allows in turn outputting the detection results to the control device of the vehicle control system with a faster timing than when the step S45 is executed for each scan.

In the explanation above, the correspondences between target angle and reception-wave phase difference illustrated in FIG. 9 can be modified in accordance with the gaps between the receiving antennas that make up the receiving antenna pairs, or in accordance with the wavelength of the reception wave. In the explanation above there are used detection results arrived at by narrowing the angles down, with good precision, through the use of three correspondences between target angle and reception waves. However, the number of correspondences is not limited to three. The present embodiment can be applied to instances where at least two correspondences (for instance, correspondences M1 and M2) are used. As long as the receiving antenna gaps in the receiving antenna pairs are dissimilar, therefore, the number of receiving antenna pairs as well as the number and arrangement of receiving antennas constituting the receiving antenna pairs are not limited to those set forth above.

The radar device 10 of the present embodiment operates by referring to data of the correspondences illustrated in FIG. 9, the data being stored beforehand in the ROM of the signal processing unit 50. The radar device 10, however, may instead determine these correspondences on the basis of calculations.

The present embodiment includes the radar device 10 that employs FM-CW radar waves to detect relative speed and relative distance to a target. However, the present embodiment can also be employed in radar devices that rely on other radar waves, provided that the radar device detects the angle of a target by a phase monopulse method.

An on-board radar for monitoring the rearward direction of a vehicle has been explained as an example of an application of the radar device. However, the radar device is not limited to this application, and may be used for monitoring ahead or sideways from the vehicle. Likewise, the present embodiment can also be employed in radar devices other than vehicle radar devices.

As explained above, the present embodiment allows expanding the angle detection range in a phase monopulse radar device, without reducing angle resolution.

What is claimed is:

1. A radar device, comprising:
a plurality of receiving antennas which receive, as a reception wave, a radar wave sent in a predetermined reference direction and reflected by a target;
a phase difference detection unit which detects a first phase difference of the reception wave received by a first receiving antenna pair that is spaced by a first gap, and a second phase difference of the reception wave received by a second receiving antenna pair that is spaced by a second gap smaller than the first gap; and
an angle detection unit which determines, as a detection angle, an angle of the target relative to the predetermined reference direction, wherein
in a first process when a difference in the detection angles for a predetermined number of times in the past lies beyond a predetermined range, the angle detection unit determines, as the detection angle, an angle corresponding to mutually coincident angles from among a plurality of first angles corresponding to the first phase difference and a plurality of second angles corresponding to the second phase difference, or
in a second process when a difference in the detection angles for a predetermined number of times in the past lies within the predetermined range, the angle detection unit determines, as the detection angle, an average of a first angle that is closest to a previous detection angle from among the plurality of first angles corresponding to the first phase difference, and a second angle that is closest to a previous detection angle from among the plurality of second angles corresponding to the second phase difference.

2. The radar device according to claim 1, wherein the mutually coincident angles comprise an average of the first and second angles that are closest to each other.

3. The radar device according to claim 1, wherein when a difference between a last-but-one detection angle and a previous detection angle by the second process lies outside the predetermined range, the angle detection unit performs the first process, and when the difference lies within the predetermined range, the angle detection unit performs the second process.

4. The radar device according to claim 1, wherein the phase difference detection unit further detects a third phase difference of the reception wave received by a third receiving antenna pair that is spaced by a third gap that is smaller than the second gap, and the angle detection unit extracts a first, a second and a third angle that are closest to one another from among the plurality of first angles, the plurality of second angles and a plurality of third angles corresponding to the third phase difference, and determines, as the detection angle, an average of the extracted first, second and third angles.

5. The radar device according to claim 4, wherein the first, second and third receiving antenna pairs are a combination of two antennas from among three antennas that are spaced apart by dissimilar gaps.

6. An angle detection method, comprising:
- a step of receiving, as a reception wave, a radar wave sent in a predetermined reference direction and reflected by a target;
- a phase difference detection step of detecting a first phase difference of the reception wave received by a first receiving antenna pair that is spaced by a first gap, and a second phase difference of the reception wave received by a second receiving antenna pair that is spaced by a second gap smaller than the first gap;
- when a difference in the detection angles for a predetermined number of times in the past lies beyond a predetermined range, a first angle detection step for determining, as a detection angle, an angle of the target relative to the reference direction corresponding to mutually coincident angles from among a plurality of first angles corresponding to the first phase difference and a plurality of second angles corresponding to the second difference; or
- when a difference in the detection angles for a predetermined number of times in the past lies within the predetermined range, a second angle detection step for determining, as a current detection angle, an average of a first angle that is closest to a previous detection angle from among the plurality of first angles corresponding to the first phase difference, and a second angle that is closest to a previous detection angle from among the plurality of second angles corresponding to the second phase difference.

7. The angle detection method according to claim 6, wherein the mutually coincident angles comprise an average of the first and second angles that are closest to each other.

8. The angle detection method according to claim 6, wherein the first angle detection step is performed when a difference between a last-but-one detection angle and a previous detection angle by the second angle detection step lies outside the predetermined range, and the second angle detection step is performed when the difference lies within the predetermined range.

* * * * *